United States Patent

Baier et al.

[11] Patent Number: 5,970,060
[45] Date of Patent: Oct. 19, 1999

[54] METHOD AND SYSTEM FOR RADIO TRANSMISSION OF DIGITAL SIGNALS

[75] Inventors: Paul-Walter Baier, Kaiserslautern; Markus Nasshan, Bocholt; Bernd Steiner, Pirmasens, all of Germany

[73] Assignee: Siemens Aktiengesellschaft, Munich, Germany

[21] Appl. No.: 08/726,248

[22] Filed: Oct. 4, 1996

[30] Foreign Application Priority Data

Oct. 6, 1995 [DE] Germany ............. 195 37 371

[51] Int. Cl.[6] .................... H04K 1/00; H04J 13/00
[52] U.S. Cl. ............... 370/342; 370/320; 370/335; 370/441; 375/200
[58] Field of Search ............... 370/342, 441, 370/335, 320; 375/200, 206, 229, 230, 231

[56] References Cited

U.S. PATENT DOCUMENTS

| | | | |
|---|---|---|---|
| 5,185,764 | 2/1993 | Baier | 375/231 |
| 5,297,162 | 3/1994 | Lee et al. | 375/206 |
| 5,345,472 | 9/1994 | Lee | 375/206 |
| 5,353,300 | 10/1994 | Lee et al. | 375/206 |
| 5,394,434 | 2/1995 | Kawabe et al. | 370/342 |
| 5,414,699 | 5/1995 | Lee | 370/342 |
| 5,479,444 | 12/1995 | Malkamaki et al. | 375/231 |
| 5,623,511 | 4/1997 | Bar-David et al. | 370/213 |
| 5,761,237 | 6/1998 | Petersen et al. | 375/200 |

FOREIGN PATENT DOCUMENTS 43 29 317 A1  2/1995  Germany.

OTHER PUBLICATIONS

Thesis: Carleton University, Ottawa, Ontario Canada, Mar. 26, 1990, Crozier, S.N.: Short–Block Data Detection Techniques Employing Channel Estimation for Fading Time–Dispersive Channels (submitting Title page and p. 70).

Primary Examiner—Chi H. Pham
Assistant Examiner—Frank Duong
Attorney, Agent, or Firm—Hill & Simpson

[57] ABSTRACT

In a radio system which operates using code division multiplex (CDMA) the interference in the training sequences, for example interblock sequences, of all the K subscribers in the received signal is overcome before data detection at the receiving end. The interference in the training sequences of all K subscribers is modeled using the estimated channel pulse responses and, finally, is subtracted from the received signal. The method and apparatus can be used in CDMA mobile radio systems, in particular with joint detection.

20 Claims, 5 Drawing Sheets

METHOD AND SYSTEM FOR RADIO TRANSMISSION OF DIGITAL SIGNALS

BACKGROUND OF THE INVENTION

The present invention relates to a method for radio transmission of digital signals, as well as, a system for radio transmission of digital signals.

A digital telecommunications system using burst transmission and code division multiplex has already been disclosed in German reference DE 43 29 317 A1. Digital mobile radio may be regarded, in particular, as an application for such a telecommunications system. In mobile radio systems, a multiplicity of mobile subscribers access the radio channel transmission medium. The multiple access problem resulting from this can be solved using the elementary multiple access methods "frequency division multiplex" (Frequency Division Multiple Access, FDMA), "time division multiplex" (Time Division Multiple Access, TDMA) or "code division multiplex" (Code Division Multiple Access, CDMA), or using combinations of these methods. In CDMA mobile radio systems, a plurality of subscribers transmit in the same frequency band at the same time. For this reason, the entire received signal is governed by the elements from a plurality of subscribers. The various subscriber signals can be separated, and the data transmitted by the individual subscribers determined, by the use of optimal estimation algorithms. In order that the said estimation algorithms can be used, it is necessary for the channel pulse responses of the radio channels of the individual subscribers to be known. As a rule, it is made possible for the receiver to obtain this information by overlaying into the transmitted signals signal sections which have been agreed in advance with the receiver and are thus known in the receiver, so that the receiver determines the channel pulse responses from the response of the channel to these known signal sections. The overlaid signal sections for determining the channel pulse responses are called training sequences. It is assumed that the signal transmission takes place in blocks, a transmitted block being called a burst. Such a burst is in each case composed, for example, of a training sequence in the form of a specific interblock sequence for channel estimation and of two data blocks which surround this interblock sequence. The burst can also be composed of in each case one training sequence in the form of a specific preamble for channel estimation and a data block which follows this preamble. Alternatively, a burst may in each case be composed, for example, of a training sequence in the form of a specific postscript to the channel estimation and of a data block which precedes this postscript. The training sequence can also be of any other nature within a burst.

Symbol interference can occur in the received signal as a result of components of the training sequences, that is to say there are values of the received signal which are governed both by data symbols and by the training sequences. This interference which is caused by training sequence components is produced, for example, when using an interblock sequence as the training sequence at the end of the data block which is in each case transmitted in a burst before the interblock sequence, and at the start of the data block which is in each case transmitted in a burst after the interblock sequence. This interference leads to a coded bit error rate of more than $10^{-2}$ in the subsequent data detection, even when a high signal-to-noise ratio is present.

SUMMARY OF THE INVENTION

The object of the present invention is to avoid the damaging effect of this interference, and thus to reduce the bit error rate in the detected data.

In general terms the present invention is a method for radio transmission of digital signals from a transmitting end to a receiving end, simultaneously, via channels which are in general different. Pulse responses of the digital signals are estimated at the receiving end before detection of the signals, the signals in each case being transmitted at discrete times in the form of successive bursts. Each of the bursts are composed of a specific training sequence for channel estimation at the receiving end and of one data block which is transmitted before the training sequence and/or one data block which is transmitted after the training sequence that contain or contains the actual signals in the form of data symbols. A spread code, assigned to the bursts, is applied linearly to the bursts in order to achieve a code division multiple access (CDMA) mode. Any interference which may be present in the training sequence with the data blocks is in each case overcome at the receiving end before the actual signal detection. This interference is modeled using the estimated channel pulse response and is subsequently subtracted from the received signal.

Advantageous developments of the present invention are as follows.

In the method K discrete-time transmitted signals are transmitted simultaneously from the transmitting end to the receiving end via K channels which are in general different. The signals have discrete-time pulse responses, the bursts of the transmitted signals in each case containing a data block before the training sequence, that is an interblock sequence, and a data block after this interblock sequence being the data symbols onto which a specific spread code which is assigned to them is linearly modulated before the transmission, and being the interblock sequence elements which are transmitted using the spread code clock. Estimates of the channel pulse responses are present at the receiving end. A received signal which has been freed of the symbol interference of the interblock sequences with the adjacent data blocks and taking account of an additive interference signal by a predetermined function.

An estimation which matches expectations, of minimal variance for the vector of all channel pulse responses is carried out for channel estimation from the received signal which is caused by the interblock sequences and from the additive interference.

Filters which are matched to the signal are used for channel estimation.

The code family for the interblock sequence code is obtained from a single basic code which is made periodic.

The channel estimation is carried out in the frequency domain by using fast correlation.

The method is used in a radio system of cellular construction having a plurality of subscribers and having one base station per radio cell. The transmission of the signals in a radio cell is carried out using the JD-CDMA method in which a multiplicity of wanted connections in a common RF frequency band are handled in parallel, for which purpose the wanted signals are spread by a specific factor on the frequency axis at the transmitting end using a different spread code. They are decoded again at the receiving location using this spread code. A common JD-CDMA specific signal detection unit is in each case used for signal detection in the receiving devices.

A linear data block equalizer with a downstream quantization stage is used for data detection, continuous-value estimated values of the data symbols being determined in the block equalizer and being combined to form vectors. Discrete-value estimated values of the data symbols are then obtained in the quantization stage by quantization of the continuous value estimated values.

The linear zero forcing block equalizer is used as the linear data block equalizer.

The minimum mean square error block equalizer is used as the linear data block equalizer.

A block equalizer having quantized feedback is used for data detection.

A zero forcing block equalizer having contest feedback is used as the block equalizer.

A minimum mean square error block equalizer having contest feedback is used as the block equalizer.

The method use in the context of a hybrid multiple access method which has a combination of code division multiplex frequency division multiplex and time division multiplex.

A system for radio transmission of digital signals from a transmitting end to a receiving end, simultaneously, via channels which are in general different. Pulse responses are estimated at the receiving end before the detection of the signals, the signals in each case being transmitted at discrete times in the form of successive bursts. Each of the bursts are composed of a specific training sequence for channel estimation at the receiving end and of one data block which is transmitted after the training sequence that contain or contains the actual signals in the form of data symbols. A spread code, which is assigned to the bursts is applied linearly in order to achieve a common CDMA mode. A digital signal processor is provided at the receiving end and overcomes any interference which may be present in the training sequence before the actual signal detection, in that this interference is modeled using the estimated channel pulse response and is subtracted from the received signal.

The signal processor has a plurality of channel estimators and a common JD detector.

A microprocessor is provided as the signal processor.

The removal of the training sequence interference has been disclosed in single-subscriber systems, that is to say for non-CDMA systems, in Crozier, S. N.: Short-Block Data Detection Techniques Employing Channel Estimation for Fading Time-Dispersive Channels: Dissertation, Carleton University, Ottawa, Ontario, Mar. 26, 1990.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

A common JD-CDMA mobile radio system will be dealt with in the following test as a transmission system chosen by way of example. In this case, only the relatively difficult uplink path will be considered, that is to say the link from the mobile subscribers to the fixed-position base station. Digital mobile radio systems are mainly cellular systems. An individual cell in the JD-CDMA mobile radio system will be considered in the following text. Discrete-time signals are assumed, which may be real or complex, discrete-time complex signals of finite length and complex sequences of finite length being represented by vectors in the case of which the v-th sequence element is equal to the v-th component of the corresponding vector. The terms element and component of a vector are used synonymously. In the following text, vectors are represented by bold lower-case letters and matrices by bold upper-case letters. The operation of transposition of a vector or of a matrix is represented by $(\bullet)^T$. The formation of the expected value of a random variable is designated $E\{\bullet\}$. Complex variables are underlined. The complex conjugate of a variable is represented by $(\bullet)^*$. In the following text, the mobile subscribers are called subscribers, for short, and the fixed-position base station is called base station, for short, variables which are assigned to the k-th subscriber are marked by a superscript (k).

Figure 1:
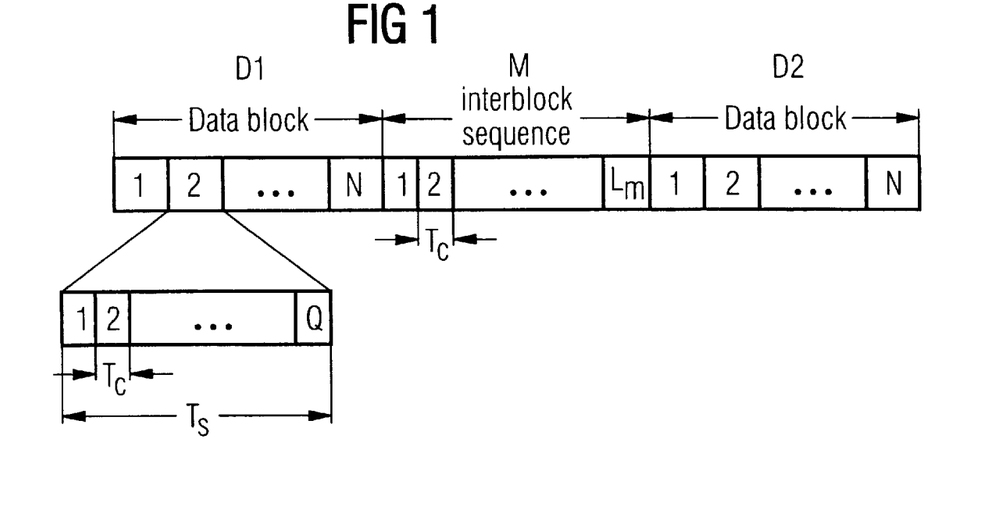
FIG. 1 shows a signal format which is intended for the method according to the present invention.

The JD-CDMA mobile radio system under consideration uses a combination of FDMA/TDMA/CDMA multiple access methods. K subscribers are active at the same time in the same frequency band in a time slot in the time frame and are distinguished only by the subscriber-specific CDMA codes. The information is transmitted in bursts. FIG. 1 shows the structure of the bursts which are transmitted by the K subscribers. Each burst is composed of a training sequence in the form of an interblock sequence m and of two data blocks D1 and D2, which are transmitted before and after the interblock sequence M. The interblock sequences M contain subscriber-specific test signals which are known to the receiver in the base station and allow channel estimation there. The interblock sequence M of the k-th subscriber is composed of $L_m$ elements $m_i^{(k)}$ is represented by the vector $$m^{(k)}=(m_1^{(k)},m_2^{(k)} \ldots m_{L_m}^{(k)})^T, m_i^{(k)} \in V_m, V_{m \subset pullout;zu313200.001}, i=1 \ldots L_m, k=1 \ldots K, \quad (1)$$

The vector $m^{(k)}$, $k=1 \ldots K$ is also called the interblock sequence code of the k-th subscriber. The sequence of elements $m_i^{(k)}$, $i=1 \ldots L_m$, $k=1 \ldots K$ of the interblock sequence code $m^{(k)}$, $k=1 \ldots K$ of the k-th subscriber, which is transmitted at the rate of $1/T_c$, is equal to the discrete-time transmitted signal of the interblock sequence M of the k-th subscriber. m The data blocks D1 and D2 respectively before and after the interblock sequence M are each composed of N data symbols $d_n$ (k,i) which is represented by the vectors $$d^{(k,i)}=(d_1^{(k,i)},d_2^{(k,i)} \ldots d_N^{(k,i)})^T, d_n^{(k,i)} \in V_d, V_d \subset \mathbb{C}, n=1 \ldots N, k=1 \ldots K, i=1,2, \quad (2)$$

The vector $d^{(k,1)}$, $k=1 \ldots K$ designates the data block D1 of the k-th subscriber before the interblock sequence $M^1d$ $^{(k,2)}$, $k=1 \ldots K$ designates the data block D2 of the k-th subscriber after the interblock sequence M. The data symbols $d_n^{(k,i)}$, $n=1 \ldots N$, $k=1 \ldots K$, $i=1,2$ are taken from the M-value symbol range $$V_d=\{v_{d,1},v_{d,2} \ldots v_{d,M}\}, v_{d,\mu} \subset \mathbb{C}, \mu=1 \ldots M, \quad (3)$$

A subscriber specific CDMA code
$$c^{(k)}=(c_1^{(k)},c_2^{(k)} \ldots c_Q^{(k)}) hu T, c_q^{(k)} \in V_c, V_c \subset \mathbb{C}, q=1 \ldots Q, k=1 \ldots K, \quad (4)$$

having Q elements is assigned to each subscriber. The elements $c_q^{(k)}$, q=1 . . . Q, k=1 . . . K of the subscriber-specific CDMA code $c^{(k)}$, k=1 . . . K of the k-th subscriber are taken from the M-value symbol range $$V_c = \{v_{c,1}, v_{c,2} \ldots v_{c,\tilde{M}}\}, v_{c,\mu} \subset \mathbb{C}, \mu=1 \ldots \tilde{M}, \quad (5)$$

Using the subscriber-specific NQ×N matrix $$\underline{C}^{(k)} = \begin{pmatrix} \underline{c}_1^{(k)} & 0 & \ldots & 0 \\ \underline{c}_2^{(k)} & 0 & \ldots & 0 \\ \vdots & \vdots & \vdots & \vdots \\ \underline{c}_Q^{(k)} & 0 & \ldots & 0 \\ 0 & \underline{c}_1^{(k)} & \ldots & 0 \\ 0 & \underline{c}_2^{(k)} & \ldots & 0 \\ \vdots & \vdots & \vdots & \vdots \\ 0 & \underline{c}_Q^{(k)} & \ldots & \ldots \\ \vdots & \vdots & \vdots & \vdots \\ 0 & 0 & \ldots & \underline{c}_1^{(k)} \\ 0 & 0 & \ldots & \underline{c}_2^{(k)} \\ \vdots & \vdots & \vdots & \vdots \\ 0 & 0 & \ldots & \underline{c}_Q^{(k)} \end{pmatrix}, \quad k = 1 \ldots K, \quad (6)$$

$$\underline{C}^{(k)} = (\underline{C}_{i,j}^{(k)}), \ i = 1 \ldots NQ, \ j = 1 \ldots N, \ k = 1 \ldots K,$$

$$\underline{C}_{q+(n-1)Q,n}^{(k)} = \begin{cases} \underline{c}_q^{(k)} & \text{for } n = 1 \ldots N, \\ & q = 1 \ldots Q, \\ & k = 1 \ldots K, \\ 0 & \text{else} \end{cases}$$

of the k-th subscriber allows the discrete-time transmitted signals $s_d^{(k,i)}$, k=1 . . . K, i=1,2 of the i-th data block $d^{(k,i)}$, k=1 . . . K i=1,2 of the k-th subscriber to be represented in accordance with Equation (2) by the matrix vector multiplication $$s_d^{(k,i)} = (s_{d,1}^{(k,i)}, s_{d,2}^{(k,i)} \ldots s_{d,NQ}^{(k,i)})^T = \underline{C}^{(k)} d^{(k,i)}, \ k=1 \ldots K, \ i=1,2 \quad (7)$$

The operation according to Equation (7) is called spectral spreading of the data symbols $d_n^{(k,i)}$, n=1 . . . N, k=1 . . . K, i=1,2 with the subscriber-specific CDMA codes $c^{(k)}$, k=1 . . . K. The ratio of the rate $1/T_s$ of the data symbols $d_n^{(k,i)}$, n=1 , , , N k=1 . . . K, i=1, 2, and the rate $1/T_c$ at which the spread transmitted signal $s_d^{(k,i)}$, K=1 . . . K, i=1, 2, of the k-th subscriber is transmitted is given by:

$$\frac{1/T_c}{1/T_s} = Q. \quad (8)$$

In spread-spectrum technology and in CDMA mobile radio systems, the variable $1/T_c$ is called the chip frequency or chip rate, the variable $T_c$ is called the chip duration, the variable $1/T_s$ is called the symbol rate and the variable $T_s$ is called the symbol duration. The discrete-time transmitted signal of the interblock sequence $m^{(k)}$, k=1 . . . K of the k-th subscriber according to Equation (1) and the discrete-time transmitted signal $s_d^{(k,i)}$ k=1 . . . K, i=1,2 of the data blocks of the k-th subscriber according to Equation (7) are transmitted at the chip rate $1/T_c$. The discrete-time transmitted signal of a burst of the k-th subscriber, using the Equations (1) and (7), is the same as the sequence of elements in the vector $$s^{(k)} = (s_1^{(k)}, s_2^{(k)} \ldots s_{2NQ+L_m}^{(k)})^T = (s_d^{(k,1)T}, m^{(k)T}, s_d^{(k,2)T})^T, \ k=1 \ldots K. \quad (9)$$

Figure 2:
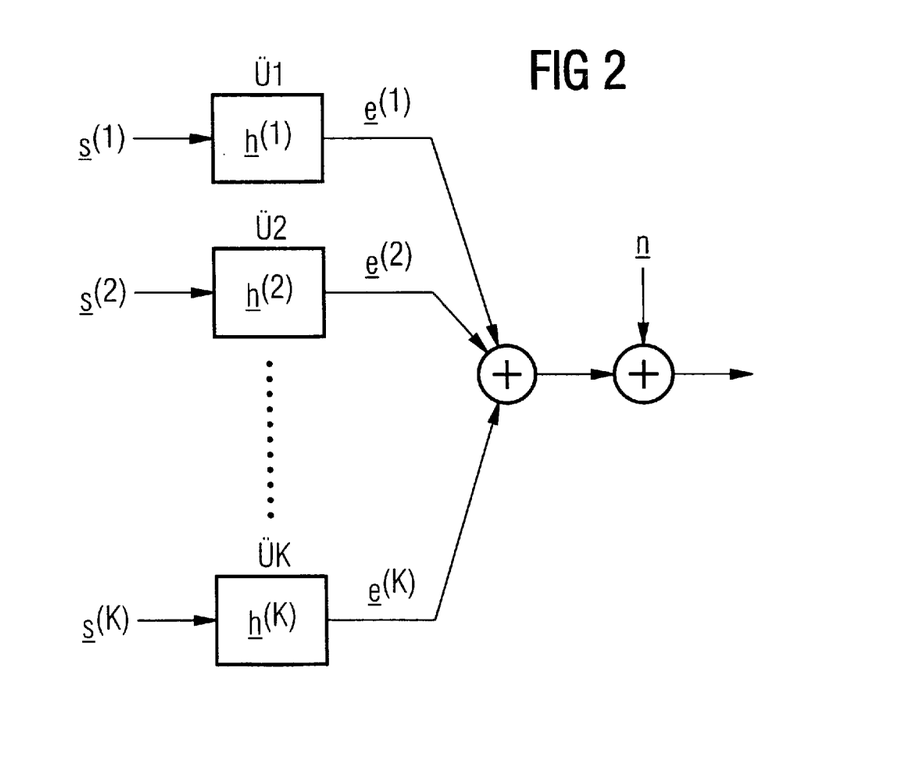
FIG. 2 shows a system model of the transmission path.

A system model of the uplink path of the JD-CDMA mobile radio system under consideration is illustrated in FIG. 2. The discrete-time transmitted signals $s^{(k)}$, k=1 . . . K, of the K subscribers according to Equation (9) are transmitted via K different transmission channels U1, U2. ..UK having the discrete-time pulse responses $$h^{(k)} = (h_1^{(k)}, h_2^{(k)} \ldots h_W^{(k)})^T, \ h_w^{(k)} \subset \mathbb{C}, \ w=1 \ldots W, \ k=1 \ldots K, (10)$$

The discrete-time pulse responses $h^{(k)}$, k=1 . . . K of the k transmission channels U1, U2 .. UK can be interpreted as discrete-time signals which are obtained by sampling the analogous pulse responses of the K transmission channels at the sampling rate $1/T_c$. The discrete-time pulse response $h^{(k)}$, k=1 . . . K of the k-th transmission channel U4 is called the channel pulse response $h_{(k)}$, k=1 . . . K, of the k-th subscriber, in the following text, for short. Using the equations (9), (10) and the subscriber-specific $(2NQ+L_m+W-1)\times(2NQ+L_m)$ matrix $$\underline{H}^{(k)} = \begin{pmatrix} \underline{h}_1^{(k)} & 0 & \ldots & 0 \\ \underline{h}_2^{(k)} & \underline{h}_1^{(k)} & \ldots & 0 \\ \vdots & \vdots & \vdots & \vdots \\ \underline{h}_W^{(k)} & \underline{h}_{W-1}^{(k)} & \ldots & 0 \\ 0 & \underline{h}_W^{(k)} & \ldots & 0 \\ \vdots & \vdots & \vdots & \vdots \\ 0 & 0 & \ldots & \underline{h}_W^{(k)} \end{pmatrix}, \quad k = 1 \ldots K, \quad (11)$$

$$\underline{H}^{(k)} = (\underline{H}_{i,j}^{(k)}),$$

$$i = 1 \ldots 2NQ + L_m + W - 1, \ j = 1 \ldots 2NQ + L_m, \ k = 1 \ldots K$$

$$\underline{H}_{l+w-1,l}^{(k)} = \begin{cases} \underline{h}_w^{(k)} & \text{for } l = 1 \ldots 2NQ + L_m, \\ & w = 1 \ldots W, \\ & k = 1 \ldots K, \\ 0 & \text{else} \end{cases}$$

produces, at the output of the transmission channel of the k-th subscriber, the discrete-time signal $$e^{(k)} = (e_1^{(k)}, e_2^{(k)} \ldots e_{2NQ+L_m+W-1}^{(k)})^T = \underline{H}^{(k)} s^{(k)}, \ k=1 \ldots K. \quad (12)$$

The signal $e^{(k)}$, k=1 . . . K according to Equation (12), which signal is caused by the transmitted signal $s^{(k)}$, k=1 . . . K, of the k-th subscriber according to Equation (9) is called the subscriber signal of the k-th subscriber, in the following text. Using Equation (12) and the additive interference $$n = (n_1, n_2 \ldots n_{2NQ+L_m+W-1})^T, \ n_i \in \mathbb{C}, \ i=1 \ldots 2NQ+L_m+W-1, \quad (13)$$

the received signal e in the base station is equal to $$\underline{e} = (e_1, e_2 \ldots e_{2NQ+L_m+W-1})^T = \underline{n} + \sum_{k=1}^{K} \underline{H}^{(k)} \underline{s}^{(k)} = \underline{n} + \sum_{k=1}^{K} \underline{e}^{(k)}. \quad (14)$$

The additive interference n represents thermal noise, interference from co-channels of adjacent cells and interference from adjacent channels as well as the interference of the cell itself and that of adjacent cells. Cellular mobile radio systems are interference-limited, that is to say the power of the interference from co-channels and adjacent channels is considerably greater than the power of the thermal noise, for which reason the latter may be ignored in the analysis of this JD-CDMA mobile radio system. As a consequence of the TDMA multiple access method being used, it is necessary that the subscriber signals $e^{(k)}$, k=1 ... K of the K subscribers, according to Equation (12), arrive at the base station in a synchronized manner. It is assumed in the following text that, except for a fraction of symbol duration $T_s$, the subscriber signals $e^{(k)}$, k=1 ... K of the K subscribers arrive at the base station, synchronized by means of a synchronization mechanism.

Figure 3:
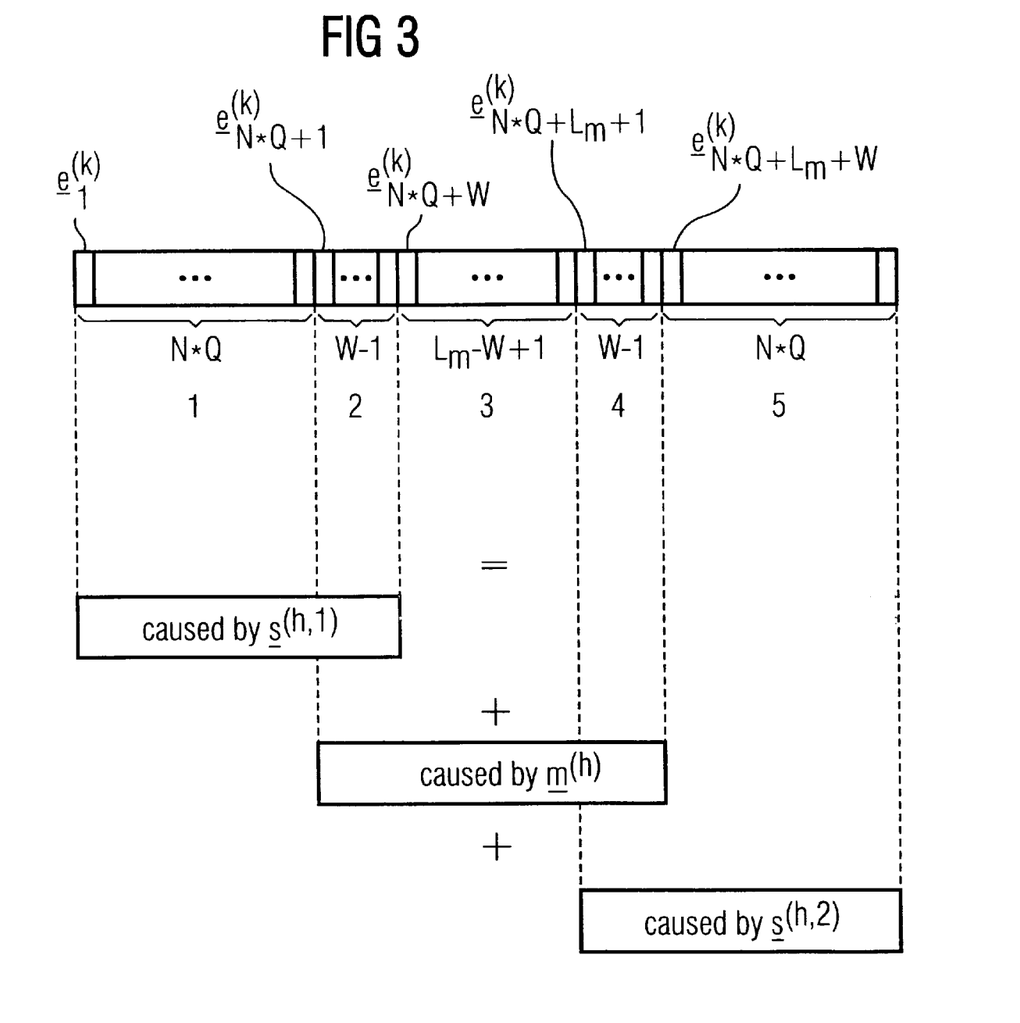
FIG. 3 shows the structure of a received subscriber signal.

FIG. 3 shows the structure of the received subscriber signal $e^{(k)}$, k=1 ... K of the k-th subscriber according to Equation (12). It can be seen from FIG. 3 that the subscriber signal $e^{(k)}$, k=1 ... K of the k-th subscriber is composed of five different sections. The first section and the fifth section of the subscriber signal $e^{(k)}$, k=1 ... K of the k-th subscriber, each of which is composed of NQ elements, are governed exclusively by that data block D1 $d^{(k,1)}$, k=1 ... K, according to Equation (2), which is transmitted before the interblock sequence M (FIG. 1), or by that data block D2 $d^{(k,2)}$, k=1 . . . K according to Equation (2), which is transmitted after the interblock sequence M. The second section and the fourth section of the subscriber signal $e^{(k)}$, k=1 ... K of the k-th subscriber, each of which is composed of W -1 elements, are governed both by the data blocks D1 and D2 $d^{(k,i)}$, k=1 ... K, i=1,2 and by the interblock sequence code $m^{(k)}$, k=1 ... K of the k-th subscriber according to Equation (1). The third section of the subscriber signal $e^{(k)}$, k=1 ... K of the k-th subscriber is governed exclusively by the interblock sequence code $m^{(k)}$, k=1 ... K of the k-th subscriber and has $$L=L_m-W+1 \tag{15}$$

elements, see FIG. 3. Using the definition $$[x]_j^i \stackrel{\text{def}}{=} (x_i, x_{i+1} \ldots x_j)^T, \ i<j, \tag{16}$$

the section of the subscriber signal $e^{(k)}$, k=1 ... K of the k-th subscriber, which is governed exclusively by the interblock sequence code $m^{(k)}$, k=1 ... K of the k-th subscriber, see Equations (12), (15) and FIG. 3, is represented by the vector $$\underline{e}_m^{(k)} = (\underline{e}_{m,1}^{(k)}, \underline{e}_{m,2}^{(k)} \ldots \underline{e}_{m,L}^{(k)})^T = [\underline{e}^{(k)}]_{(NQ+L_m)}^{(NQ+W)}, \ k=1\ldots K, \tag{17}$$

Equations (14), (17) and the section $$\underline{n}_m = (\underline{n}_{m,1}, \underline{n}_{m,2} \ldots \underline{n}_{m,L})^T = [\underline{n}]_{(NQ+L_m)}^{(NQ+W)} \tag{18}$$

of the additive interference n according to Equation (13) results in the received signal in the base station, which signal is caused by the interblock sequences $m^{(k)}$, k=1 ... K of the K subscribers and the additive interference n being $$\underline{e}_m = (\underline{e}_{m,1}, \underline{e}_{m,2} \ldots \underline{e}_{m,L})^T = [\underline{e}]_{(NQ+L_m)}^{(NQ+W)} = \underline{n}_m + \sum_{k=1}^{K} \underline{e}_m^{(k)} \tag{19}$$

Using the L×W matrix $$\underline{G}^{(k)} = \begin{pmatrix} \underline{m}_W^{(k)} & \underline{m}_{W-1}^{(k)} & \cdots & \underline{m}_2^{(k)} & \underline{m}_1^{(k)} \\ \underline{m}_{W+1}^{(k)} & \underline{m}_W^{(k)} & \cdots & \underline{m}_3^{(k)} & \underline{m}_2^{(k)} \\ \vdots & \vdots & & \vdots & \vdots \\ \underline{m}_{W+L-2}^{(k)} & \underline{m}_{W+L-3}^{(k)} & \cdots & \underline{m}_L^{(k)} & \underline{m}_{L-1}^{(k)} \\ \underline{m}_{W+L-1}^{(k)} & \underline{m}_{W+L-2}^{(k)} & \cdots & \underline{m}_{L+1}^{(k)} & \underline{m}_L^{(k)} \end{pmatrix}, \tag{20}$$

$$k = 1\ldots K,$$

$$\underline{G}^{(k)} = (\underline{G}_{i,j}^{(k)}), \ i = 1\ldots L, \ j = 1\ldots W, \ k = 1\ldots K,$$

$$\underline{G}_{i,j}^{(k)} = \underline{m}_{W+i-j}^{(k)},$$

which contains elements $m_i^{(k)}$, i=1 ... $L_m$, k=1 ... K of the interblock sequence code $m^{(k)}$, k=1 ... K of the k-th subscriber according to Equation (1), the subscriber signal $e_m^{(k)}$, k1 ... K of the k-th subscriber can be represented according to Equation (17) by $$e_m^{(k)} = G^{(k)} h^{(k)}, \ k=1 \ldots K, \tag{21}$$

In order to represent the problem of channel estimation in a compact manner, it is worthwhile combining the channel pulse responses $h^{(k)}$, k=1 ... K, of the K subscribers according to Equation (10) to form the vector $$h = (h_1, h_2 \ldots h_{KW})^T = (h^{(1)T}, h^{(2)T} \ldots h^{(K)T})^T \tag{22}$$

The vector h according to Equation (22) is called the vector of all the channel pulse responses. Using the L×KW matrix $$G = (G^{(1)}, G^{(2)} \ldots G^{(K)}), \tag{23}$$

cf. Equation (20), the received signal $e_m$ according to Equation (19) can be represented, using h according to Equation (22), by $$\underline{e}_m = \underline{n}_m + \sum_{k=1}^{K} \underline{G}^{(k)} \underline{h}^{(k)} = \underline{n}_m + \underline{G}\,\underline{h} \tag{24}$$

The received signal $e_m$ according to Equation (19) and (24) is the basis of the channel estimation in JD-CDMA mobile radio systems.

According to the present invention, the interference from the interblock sequences $m^{(k)}$, k=1 ... K according to Equation(1) is removed from the received signal e according to Equation (14) before the data detection in the base station. Using equation (14), the zero vector $$0_u = (\overbrace{0,0,\ldots 0}^{u \text{ zereos}})^T, \tag{25}$$

which has u components, and the matrix H(k), k=1 ... K according to Equation (11), the received signal is obtained from which the interference of the interblock sequences $m^{(k)}$, k=1 ... K of the K subscribers according to Equation (1) has been removed.

$$\begin{aligned} \hat{e} &= (\hat{e}_1, \hat{e}_2 \ldots \hat{e}_{2NQ+L_m+W-1})^T \\ &= \underline{e} - \sum_{k=1}^{K} \underline{H}^{(k)} (0_{NQ}^T, \underline{m}^{(k)T}, 0_{NQ}^T)^T \end{aligned} \tag{26}$$

-continued $$\dot{e} = \underline{n} + \sum_{k=1}^{K} \underline{H}^{(k)} \left( \underline{s}_d^{(k,1)T}, \underline{m}^{(k)T}, \underline{s}_d^{(k,2)T} \right)^T -$$

$$\sum_{k=1}^{K} \underline{H}^{(k)} \left( 0_{NQ}^T, \underline{m}^{(k)T}, 0_{NQ}^T \right)^T$$

$$= \underline{n} + \sum_{k=1}^{K} \underline{H}^{(k)} \left( \underline{s}_d^{(k,1)T}, 0_{L_m}^T, \underline{s}_d^{(k,2)T} \right)^T.$$

Using the discrete-time transmitted signals $s_d^{(k,i)}$, k=1 ... K, i=1,2 of the data blocks according to Equation (7), Equation (26) becomes $$\dot{e} = \underline{n} + \sum_{k=1}^{K} \underline{H}^{(k)} \left( (\underline{C}^{(k)} \underline{d}^{(k,1)})^T, 0_{L_m}^T, (\underline{C}^{(k)} \underline{d}^{(k,2)})^T \right)^T. \quad (27)$$

Sections of the received signal ě according to Equation (26) from which the interference of the interblock sequences $m^{(k)}$, k=1 ... K have been removed, are given by the vectors $$\underline{e}_d^{(1)} = (e_{d,1}^{(1)}, e_{d,2}^{(1)}, \ldots e_{d,NQ+W-1}^{(1)})^T = [\check{e}]_{(NQ+W-1)}^1, \quad (28)$$

$$\underline{e}_d^{(2)} = (e_{d,1}^{(2)}, e_{d,2}^{(2)}, \ldots e_{d,NQ+W-1}^{(2)})^T = [\check{e}]_{(2NQ+L_m+W-1)}^{(NQ+L_m+1)}$$

Using the sections $$\underline{n}_d^{(1)} = (n_{d,1}^{(1)}, n_{d,2}^{(1)}, \ldots n_{d,NQ+W-1}^{(1)})^T = [\check{n}]_{(NQ+W-1)}^1, \quad (29)$$

$$\underline{n}_d^{(2)} = (n_{d,1}^{(2)}, n_{d,2}^{(2)}, \ldots n_{d,NQ+W-1}^{(2)})^T = [\check{n}]_{(2NQ+L_m+W-1)}^{(NQ+L_m+1)}$$

of the additive interference n according to Equation (13), and the definition $$[\underline{X}]_{q,j}^{p,i} \stackrel{\text{def}}{=} \begin{pmatrix} X_{p,i} & X_{p,i+1} & \cdots & X_{p,j} \\ X_{p+1,i} & X_{p+1,i+1} & \cdots & X_{p+1,j} \\ \vdots & \vdots & & \vdots \\ X_{q,i} & X_{q,i+1} & \cdots & X_{q,j} \end{pmatrix}, p < q, i < j, \quad (30)$$

$e_d^{(1)}$ and $e_d^{(2)}$ according to Equation (28) can be represented by $$\underline{e}_d^{(1)} = \underline{n}_d^{(1)} + \sum_{k=1}^{K} [\underline{H}^{(k)}]_{(NQ+W-1),(NQ)}^{1,1} \underline{C}^{(k)} \underline{d}^{(k,1)}, \quad (31)$$

$$\underline{e}_d^{(2)} = \underline{n}_d^{(2)} + \sum_{k=1}^{K} [\underline{H}^{(k)}]_{(2NQ+L_m+W-1),(2NQ+L_m)}^{(NQ+L_m+1),(NQ+L_m+1)} \underline{C}^{(k)} \underline{d}^{(k,2)}$$

In the interference-free case $e_d^{(1)}$ is caused exclusively by the data blocks $d^{(k,1)}$, k=1 ... K of the K subscribers according to Equation (2) before the interblock sequence, and $e_d^{(2)}$ is caused exclusively by the data blocks $d^{(k,2)}$, k=1 ... K of the K subscribers according to Equation (2) after the interblock sequence.

The combined channel pulse response $$b^{(k)} = (b_1^{(k)}, b_2^{(k)} \ldots b_{Q+W-1}^{(k)})^T = c^{(k)} * h^{(k)}, k=1 \ldots K, \quad (32)$$

of the k-th subscriber is defined by the discrete-time convolution of the channel pulse response $h^{(k)}$, k=1 ... K of the k-th subscriber according to Equation (10) with the subscriber-specific CDMA code $c^{(k)}$, k=1 ... K of the k-th subscriber according to Equation (4). The operation of discrete-time convolution is designated by * in Equation (32) Using the combined channel pulse response $b^{(k)}$, k=1 ... K according to Equation (32), K subscriber-specific (NQ+W−1)×N matrices $$\underline{A}^{(k)} = (A_{i,j}^{(k)}), i = 1 \ldots NQ + W - 1, j = 1 \ldots N, k = 1 \ldots K, \quad (33)$$

$$A_{(n-1)Q+l,n}^{(k)} = \begin{cases} b_l^{(k)} & \text{for } n = 1 \ldots N, \\ & l = 1 \ldots Q + W - 1, \\ & k = 1 \ldots K, \\ 0 & \text{else} \end{cases}$$

are produced and are combined to form the (NQ+W−1)×KN matrix $$A = (A^{(1)}, A^{(2)} \ldots A^{(K)}) \quad (34)$$

The data blocks $d^{(k,i)}$, k=1 ... K, i=1,2 of the K subscribers according to Equation (2) are combined to form the vectors $$d^{(i)} = (d_1^{(i)}, d_2^{(i)} \ldots d_{KN}^{(i)})^T d_{n+(k-1)N}^{(i)} = d_n^{(k,i)}, n=1 \ldots N, k=1 \ldots K, i=1,2, \quad (35)$$

Using equations (34), (35) and the additive interference $n_d^{(i)}$, i=1, 2, according to Equation (29), the received signals $e_d^{(i)}$, i=1,2 according to Equation (28) are given by:

$$e_d^{(i)} = Ad^{(i)} + n_d^{(i)}, i=1,2. \quad (36)$$

For example, the following clear representation of Equation (36) is obtained for Q equal to 2. W equal to 4, N equal to 5 and K equal to 2:

$$
\underline{e}_d^{(1)} \begin{pmatrix} \underline{e}_{d,1}^{(i)} \\ \underline{e}_{d,1}^{(i)} \\ \vdots \\ \underline{e}_{d,12}^{(i)} \\ \underline{e}_{d,13}^{(i)} \end{pmatrix} = \begin{pmatrix} \underline{b}_1^{(1)} & 0 & 0 & 0 & 0 & \underline{b}_1^{(2)} & 0 & 0 & 0 & 0 \\ \underline{b}_2^{(1)} & 0 & 0 & 0 & 0 & \underline{b}_2^{(2)} & 0 & 0 & 0 & 0 \\ \underline{b}_3^{(1)} & \underline{b}_1^{(1)} & 0 & 0 & 0 & \underline{b}_3^{(2)} & \underline{b}_1^{(2)} & 0 & 0 & 0 \\ \underline{b}_4^{(1)} & \underline{b}_2^{(1)} & 0 & 0 & 0 & \underline{b}_4^{(2)} & \underline{b}_2^{(2)} & 0 & 0 & 0 \\ \underline{b}_5^{(1)} & \underline{b}_3^{(1)} & \underline{b}_1^{(1)} & 0 & 0 & \underline{b}_5^{(2)} & \underline{b}_3^{(2)} & \underline{b}_1^{(2)} & 0 & 0 \\ 0 & \underline{b}_4^{(1)} & \underline{b}_2^{(1)} & 0 & 0 & 0 & \underline{b}_4^{(2)} & \underline{b}_2^{(2)} & 0 & 0 \\ 0 & \underline{b}_5^{(1)} & \underline{b}_3^{(1)} & \underline{b}_1^{(1)} & 0 & 0 & \underline{b}_5^{(2)} & \underline{b}_3^{(2)} & \underline{b}_1^{(2)} & 0 \\ 0 & 0 & \underline{b}_4^{(1)} & \underline{b}_2^{(1)} & 0 & 0 & 0 & \underline{b}_4^{(2)} & \underline{b}_2^{(2)} & 0 \\ 0 & 0 & \underline{b}_5^{(1)} & \underline{b}_3^{(1)} & \underline{b}_1^{(1)} & 0 & 0 & \underline{b}_5^{(2)} & \underline{b}_3^{(2)} & \underline{b}_1^{(2)} \\ 0 & 0 & 0 & \underline{b}_4^{(1)} & \underline{b}_2^{(1)} & 0 & 0 & 0 & \underline{b}_4^{(2)} & \underline{b}_2^{(2)} \\ 0 & 0 & 0 & \underline{b}_5^{(1)} & \underline{b}_3^{(1)} & 0 & 0 & 0 & \underline{b}_5^{(2)} & \underline{b}_3^{(2)} \\ 0 & 0 & 0 & 0 & \underline{b}_4^{(1)} & 0 & 0 & 0 & 0 & \underline{b}_4^{(2)} \\ 0 & 0 & 0 & 0 & \underline{b}_5^{(1)} & 0 & 0 & 0 & 0 & \underline{b}_5^{(2)} \end{pmatrix}_{\underline{A}} \begin{pmatrix} \underline{d}_1^{(i)} \\ \underline{d}_2^{(i)} \\ \underline{d}_3^{(i)} \\ \underline{d}_4^{(i)} \\ \underline{d}_5^{(i)} \\ \underline{d}_6^{(i)} \\ \underline{d}_7^{(i)} \\ \underline{d}_8^{(i)} \\ \underline{d}_9^{(i)} \\ \underline{d}_{10}^{(i)} \end{pmatrix} + \underline{n}_d^{(i)} \begin{pmatrix} \underline{n}_{d,1}^{(i)} \\ \underline{n}_{d,2}^{(i)} \\ \vdots \\ \underline{n}_{d,12}^{(i)} \\ \underline{n}_{d,13}^{(i)} \end{pmatrix}.
$$
$$i=1,2.$$
(37)

The matrices $A^{(k)}$, k=1 ... K, according to Equation (33) are given, cf. Equations (31) and (36), by $$\underline{A}^{(k)} = [\underline{H}^{(k)}]_{(NQ+W-1),(NQ)}^{1,1} \underline{C}^{(k)} \qquad (38)$$
$$= [\underline{H}^{(k)}]_{(2NQ+L_m+W-1),(2NQ+L_m)}^{(NQ+L_m+1),(NQ+L_m+1)} \underline{C}^{(k)}, \; k = 1 \ldots K.$$

The received signals $e_d^{(i)}$, i=1,2 according to Equations (28) and (36) are the basis for data detection in JD-CDMA mobile radio systems.

In the JD-CDMA mobile radio system being considered, the problem of channel estimation is solved by the use of algorithms for high-resolution and simultaneous estimation of a plurality of channel pulse responses $h^{(k)}$, k=1 ... K. The theory of channel estimation has been disclosed in a series of publications, for example in Steiner, B.: Ein Beitrag zur Mobilfunk-Kanalschäatzung unter besonderer Berücksichtigung synchroner CDMA-Mobilefunksysteme mit Joint-Detection, (an article on mobile radio channel estimation, paying particular attention to synchronous CDMA mobile radio systems with Joint detection). Progress Reports VDI Series 10, No. 337, VDI Press, Düsseldorf 1995, in steiner, B.: Jung, P.; Optimum and Suboptimum Channel estimation for the Uplink of CDMA Mobile Radio Systems with Joint Detection. European Transactions on Telecommunications and Related Technologies, Vol. 5 (1994), pages 39–50, and in Steiner, B. Klein A.; Kanal-und Datenschätzungf in synchronen CDMA- Mobilfunksystemen mit Interferenzeliminierung (Channel and data estimation in synchronous CDMA mobile radio systems with interference elimination) Kleinheubacher Reports, Vol. 36 (1993), pages 253–269.

The aim of channel estimation is to determine an estimate $\hat{h}$ of the vector h of all channel pulse responses according to Equation (22) from the received signal $e_m$ according to Equations (19) and (24). In the following text, it is assumed that the additive interference $n_m$ according to Equation (18) has the expected value of zero. Using Equation (25), the expected value of the additive interference $n_m$ according to Equation (18) is given by $$E\{n_m\}=O_L. \qquad (39)$$

Using Equations (19), (23) and the Hermitian L×L convoriance matrix $$R_{n_m} = E\{\underline{n}_m \underline{n}_m^{*T}\} = E\left\{\begin{pmatrix} |n_{m,1}|^2 & n_{m,1}n_{m,2}^* & \cdots & n_{m,1}n_{m,L}^* \\ n_{m,2}n_{m,1}^* & |n_{m,2}|^2 & \cdots & n_{m,2}n_{m,L}^* \\ \vdots & \vdots & & \vdots \\ n_{m,L}n_{m,1}^* & n_{m,L}n_{m,2}^* & \cdots & |n_{m,L}|^2 \end{pmatrix}\right\} \quad (40)$$

of the interference $n_m$ according to Equation (18), the estimate, in line with expectation, of minimal variance of the vector h of all channel pulse responses according to Equation (22) is given by $$\hat{h}=(\hat{h}_1, \hat{h}_2 \ldots \hat{h}_{KW})^T=(G^{*T}R_{n_m}^{-1}G)^{-1}G^{*T}R_{n_m}^{-1}e_m \qquad (41)$$

For normally distributed elements $n_{m,l}$, I=1 ... L of the additive interference $n_m$ according to Equation (18), h according to Equation (41) is also the maximum-likelihood estimate of vector h of all channel pulse responses according to Equation (22). In the following analysis relating to channel estimation, it is assumed that the elements $n_{m,i}$, i=1 ... L of the additive interference $n_m$ according to Equation (18) are uncorrelated using the u×u matrix $$I_u=(\delta_{i,j}), \; \delta_{i,j}=0 \forall i \neq j, \; \delta_{i,i}=1 \; \forall i, \; i,j=1 \ldots u. \qquad (42)$$

and the variance $\sigma^2$ of the additive interference $n_m$ according to (18), then $$R_{n_m}=\sigma^2 I_L. \qquad (43)$$

Using Equation (43), the estimation according to Equation (41) is given by:

$$\hat{h}=(G^{*T}G)^{-1}G^{*T}e_{m-h+(G^{*T}G)^{-1}G^{*T}n_{m-h+\epsilon h}}. \qquad (44)$$

The vector $\epsilon_h$ in Equation (44) is the estimation error. In order that the estimate according to $\hat{h}$ from Equation (44) exists, the matrix $G^{*T}G$ must be regular. A necessary but not sufficient condition which must be satisfied in the production of the matrix G according to Equation (23) in order that $G^{*T}G$ is regular is $$KW \leq L \quad (45)$$

If equation (45) is satisfied, it is a sufficient condition for the regularity of the matrix $G^{*T}G$ that the matrix $G^{*T}G$ has only intrinsic values which do not disappear. The case in which the matrix $G^{*T}G$ has intrinsic values equal to zero although Equation (45) is true occurs, for example, when two or more subscribers use the same interblock sequence code $m^{(k)}$, k=1 . . . K according to Equation (1).

Using Equation (44), an estimate $\hat{h}$ of minimal variance for the vector h of all channel pulse responses according to Equation (22) is obtained. Equation (44) does not make any statement relating to the quality of the estimation $\hat{h}$ according to Equation (44). A quality criterion is derived in the following text, allowing an assessment of the estimate $\hat{h}$ according to Equation (44). A constraining precondition is that the elements $m_i^{(k)}$, i=1 . . . $L_m$, k=1 . . . K of the interblock sequence codes $m^{(k)}$, k=1 . . . K according to Equation (1) are taken from a binary symbol range. Then:

$$m_i^{(k)} \epsilon V_m, V_m = \{+1,-1\}, i=1 \ldots L_m, k=1 \ldots K. \quad (46)$$

It is evident that the quality of the estimate $\hat{h}$ according to Equation (44) depends critically on the characteristics of the interblock sequence codes $m^{(k)}$, k=1 . . . K, according to Equation (1). The K interblock sequence codes $m^{(k)}$, k=1 . . . K of the K subscribers are also called the code family $m^{(k)}$, k=1 . . . K in the following text. Channel estimation using filtering matched to the signal is considered first of all. Filtering matched to the signal gives the estimate of the vector h of all channel pulse responses according to Equation (22) as $$\hat{h}_{MF} = (\hat{h}_{MF,1}, \hat{h}_{MF,2} \cdots \hat{h}_{MF,KW})^T = \quad (47)$$
$$\frac{1}{L} \underline{G}^{*T} \underline{e}_m = \frac{1}{L} \underline{G}^{*T} \underline{G} \underline{h} + \frac{1}{L} \underline{G}^{*T} \underline{n}_m.$$

The estimate $\hat{h}_{MF}$ according to Equation (47) matches the expectation provided the matrix $G^{*T}G$ is equal to the unit matrix $I_L$, see Equation (42), except for a constant factor. A code family $m^{(k)}$, k=1 . . . K, is called a code family with ideal correlation characteristics when $$G^{*T}G = LI_L \quad (48)$$

is satisfied. The factor L in Equation (48) is thus caused by the fact that all the elements $m_i^{(k)}$, i=1 . . . K in the code family $m^{(k)}$, k=1 . . . K have unity magnitude, and the elements on the main diagonal of the matrix $G^{*T}G$ are squares of the magnitudes of the norms of the column vectors of the matrix G according to Equation (23). Since all of the column vectors in the matrix G according to Equation (23) have L elements, see is Equations (20) and (23), the sum of these L squares of magnitudes is equal to L. A code family having ideal correlation characteristics will be used as the basis initially. The signal-to-noise ratio of the estimated value $\hat{h}_{MF}$, u u=1 . . . KW, according to Equation (47) is given, using the variance $\sigma^2$ of the additive interference $n_m$, see Equation (43), by $$\gamma_{MF,u} = \frac{L|h_w^{(k)}|^2}{\sigma^2}, u = w + (k-1)W, k = 1 \ldots K, w = 1 \ldots W. \quad (49)$$

In the case when Equation (48) is not true, the estimate $\hat{h}_{MF}$ according to Equation (47) does not match the expectation since the matrix $G^{*T}G$ has elements, which do not disappear, off the main diagonal.

The signal-to-noise ratio of the estimated value $\hat{h}_u$, u=1 . . . KW according to Equation (44) is given, with the variance $\sigma^2$ of the additive interference $n_m$, see Equation (43), and the u-th diagonal element $q_u$, u=1 . . . KW of the matrix $G^{*T}G$ by $$\gamma_u = \frac{|h_w^{(k)}|^2}{q_u \sigma^2}, u = w + (k-1)W, k = 1 \ldots K, w = 1 \ldots W. \quad (50)$$

An important criterion for the assessment of the estimated value $\hat{h}_u$, u=1 . . . KW according to Equation (44) is the degradation $$d_u/dB = 10\log_{10}\left(\frac{\gamma_{MF,u}}{\gamma_u}\right) = 10\log_{10}(Lq_u), u = 1 \ldots KW, \quad (51)$$

of the signal-to-noise ratio $y\mu$, u=1 . . . KW according to Equation (50) in comparison with the signal-to-noise ratio $Y_{MF,u}$, u=1 . . . KW according to Equation (49). The degradations $d_u$, u=1 . . . KW, according to Equation (51) in general differ for different values of the parameter u. The mean degradation $$\overline{d}/dB = 10\log_{10}\left(\frac{L}{KW}\sum_{u=1}^{KW} q_u\right) \quad (52)$$

can be used to assess the estimate h according to Equation (44). If a code family $m^{(k)}$, k=1 . . . K having ideal correlation characteristics is used, that is to say Equation (48) is true, then $\overline{d}$ according to Equation (52) is equal to zero. The degradation $\overline{d}$ according to Equation (52) is a measure of the price which must be paid for the estimate $\hat{h}$ according to Equation (44) to match the expectation. In order that the energy in the interblock sequences is utilized as efficiently as possible, $\overline{d}$ according to Equation (52) should be as small as possible, that is to say less than 1 dB.

One method of finding the binary elements $m_i^{(k)}$, i=1 . . . $L_m$, k=1 . . . K according to Equations (1) and (46) is to randomize all the elements $m_i^{(k)}$, i=1 . . . $L_m$, k=1 . . . K, by using a random-number generator. Randomizing the elements $m_j^{(k)}$, i=1 . . . $L_m$, k=1 . . . K in a code family $m^{(k)}$, k=1 . . . K, means that the elements $m_i^{(k)}$, i=1 . . . $L_m$, i=1 . . . K are given the values +1 or -1 with the same probability from a random-number generator, see Equation (46), and that no other elements $m_j^{(k)}$, j=1 . . . $L_m$, k=1 . . . K, i≠j in the code family $m^{(k)}$, k=1 . . . K, has its value influenced by the element $m_i^{(k)}$. An important parameter in channel estimation is the over-identification degree.

$$v_G = \frac{L}{KW} - 1 \quad (53)$$

of the estimation problem given by the Equation (19). The over identification degree $V_G$ according to Equation (53) is the difference, normalized to KW, between the number L of elements in the received signal $e_m$ according to Equation (19) and the number KW of elements $h_w^{(k)}$, w=1 . . . W, k=1 . . . K, which are to be estimated, of the vector h of all channel pulse responses according to Equation (22). If KW is equal to L, the over identification degree $V_G$ according to Equation (53) is equal to zero, that is to say the number of elements of $e_m$, according to Equation (19) is just sufficient to estimate the KW elements $h_w^{(k)}$, w=1 . . . W, k=1 . . . K of the vector h of all channel pulse responses according to Equation (22). Using Equation (45), $V_G$ is always greater than or equal to zero. In the uplink path of JD-CDMA mobile radio systems, the over identification degree $V_G$ according to Equation (53) is typically less than 0.1. A systematic search for the code family $m^{(k)}$, k=1 . . . K, using the smallest mean degradation $\bar{d}$ according to Equation (52), is in general not possible because of the large number of degrees of freedom $$n_f(m^{(k)})=KL_m \qquad (54)$$

of the code families $m^{(k)}$, k=1 . . . K. If, for example, K is equal to 8 and L is equal to 256 (these are typical values in JD-CDMA mobile radio systems), then the number of degrees of freedom $n_f(m^{(k)})$ according to Equation (54) turns out to be 2048, that is to say there are $2^{2048}$ code families $m^{(k)}$, k=1 . . . K whose mean degradations $\bar{d}$ according to Equation (52) would have to be defined in order to find the code family having the smallest mean degradation $\bar{d}$ according to Equation (52). The search for code families $m^{(k)}$, k=1 . . . K having small mean degradations $\bar{d}$ according to Equation (52) can therefore be carried out only heuristically.

The code family $m^{(k)}$, k=1 . . . K which has a mean degradation $\bar{d}$ according to Equation (52) which is less than 1 dB even for an over identification degree $V_G$ according to Equation (53) of less than 0.1 can be found by the following steps:

reduction in the number of degrees of freedom $n_f(M^{(k)})$ of the code family $m^{(k)}$, k=1 . . . K by obtaining the code family $m^{(k)}$, k=1 . . . K from a single basic code m which has been made periodic, and application of an optimization method to the basic code m which has been made periodic.

Obtaining the code family from a single basic code m which has been made periodic has the additional advantage that the channel estimation can then be carried out in a favorable manner in terms of complexity in the frequency domain, by using fast correlation.

The basic idea when obtaining the code family $m^{(k)}$, k=1 . . . K from a single basic code m which has been made periodic is that the estimation of a plurality of channel pulse responses $h^{(k)}$, k=1 . . . K according to Equation (10) can be based on the estimation of a single channel pulse response h according to Equation (22). The estimate $\hat{h}$ according to Equation (44) of the vector h of all the channel pulse responses according to Equation (22) can then be determined using the methods which are used for estimation of a single channel pulse response. The point of origin for the analysis is a basic code, which has been made periodic.

$$m=(m_1, m_2 \ldots m_{L_m+(K-1)W})^T, \qquad (55)$$

for whose elements it can be stated that:

$$m_i=m_{i-p},\ i=(P+1) \ldots (L_m+(K-1)\ W),\ P \leq L \qquad (56)$$

The P elements $m_i$, i=1 . . . P of one period of m according to Equation (55) can be combined to form the vector $$m_p=(m_1, m_2 \ldots m_p)^T \qquad (57)$$

The case $$P=L=KW, \qquad (58)$$

is of particular interest since the over identification degree $V_G$ according to Equation (53) is then equal to zero and because the channel estimator can be implemented in a manner which is particularly favorable in terms of outlay for P being equal to KW. Using Equation (58) it can be stated for the basic code m which has been made periodic, according to Equation (55), that $$m=(m_1,m_2 \ldots m_{P+KW-1})^T. \qquad (59)$$

A code family $m^{(k)}$ is obtained from the basic code m which has been made periodic, according to Equation (59), using the rule $$m_i^{(k)}=m_{i+(K-k)W},\ i=1 \ldots L_m,\ k=1 \ldots K \qquad (60)$$

Figure 4:
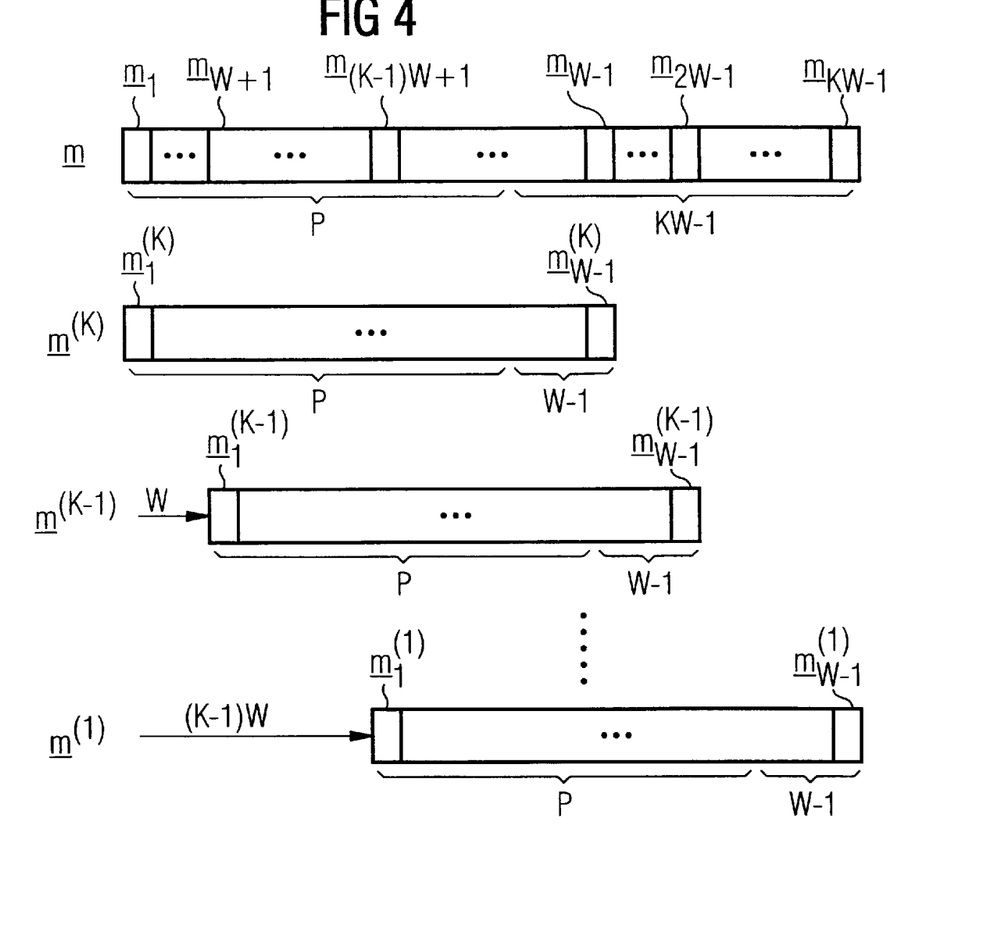
FIG. 4 shows the principle for obtaining the code family from a basic code which has been made periodic.

FIG. 4 shows how a code family $m^{(k)}$, k=1 . . . K is obtained from a basic code m which has been made periodic, according to Equation (59), by using Equation (60). In FIG. 4, elements $m_i^{(k)}$, i=1 . . . P+W−1, k=1 . . . K and $m_i$, i=1 . . . P+KW−1, which are one above the other are equal. If the code family $m^{(k)}$, k=1 . . . K is derived from a basic code m which has been made periodic, then, using Equations (58), (59) and (60) for the matrix G according to Equation (23).

$$G = \begin{pmatrix} m_P & m_{P-1} & \cdots & m_2 & m_1 \\ m_1 & m_P & \cdots & m_3 & m_2 \\ \vdots & \vdots & & \vdots & \vdots \\ m_{P-2} & m_{P-3} & \cdots & m_P & m_{P-1} \\ m_{P-1} & m_{P-2} & \cdots & m_1 & m_P \end{pmatrix} \qquad (61)$$

that is to say the matrix G according to Equation (61) is clockwise-circulant and is thus defined completely by a column and row vector which can be selected arbitrarily and has P elements. Since the matrix G according to Equation (61) is in addition square, it can be said for the estimate $\hat{h}$ according to Equation (44) that $$\hat{h}=(G^{*T}G)^{-1}G^{*T}e_m=G^{-1}(G^{*T})^{-1}G^{*T}e_m=G^{-1}e_m. \qquad (62)$$

The inverse of the clockwise-circulant matrix G according to Equation (61) is likewise clockwise-circulant and may be represented in the form $$\underline{G}^{-1} = \begin{pmatrix} t_P & t_{P-1} & \cdots & t_2 & t_1 \\ t_1 & t_P & \cdots & t_3 & t_2 \\ \vdots & \vdots & & \vdots & \vdots \\ t_{P-2} & t_{P-3} & \cdots & t_P & t_{P-1} \\ t_{P-1} & t_{P-2} & \cdots & t_1 & t_P \end{pmatrix} \qquad (63)$$

The matrix $G^{-1}$ according to Equation (63) has the same structure as the matrix G according to Equation (61) and is likewise defined completely by a column and row vector which can be selected arbitrarily and has P elements. Because of Equation (46), the matrices G and $G^{-1}$ are real. Only P real elements $t_u$, u=1 . . . P, therefore need be stored in the digital memory of the channel estimator in order to define $G^{-1}$ unambiguously. The definition of $\hat{h}$ according to Equation (62) can be carried out by cyclic correlation of the received signal $e_m$ according to Equation (19) with an arbitrary row or column vector, for example using the first column vector $$s_1=(s_{1,1},s_{1,2} \ldots s_{1,P})^T=(t_P,t_1 \ldots t_{P-2}, t_{P-1})^T \qquad (64)$$

in the matrix $G^{-1}$ according to Equation (63). The cyclic correlation of $s_1$ according to Equation (64) with the received signal $e_m$ according to Equation (19) can be carried out in a favorable manner in terms of outlay in the frequency domain, by fast correlation.

The aim of the subsequent data detection, whose principles are disclosed in a series of publications, is to determine estimates of the data vectors $\underline{d}^{(i)}$, i=1,2 according to Equation (35) from the received signals $\underline{n}_d^{(i)}$, i=1,2 according to Equation (28) which are subject to interference from $\underline{e}_d^{(i)}$ i=1,2 according to Equation (29). Data detectors are considered here which are composed of a linear block equalizer with a downstream quantization stage, or of a block equalizer with quantized feedback.

Figure 5:
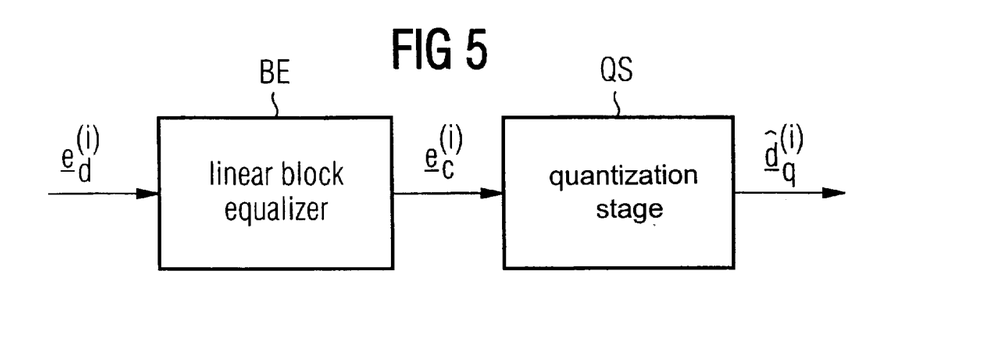
FIG. 5 shows the structure of data detectors which are composed of a linear block equalizer and a downstream quantization stage.

The structure of the data detectors, which are composed of a linear block equalizer BE with a downstream quantization stage QS, is illustrated in FIG. 5. Using the received signals $\underline{e}_d^{(i)}$, i=1,2 according to Equations (28) and (36), the linear block equalizer BE determines continuous-value estimates $\hat{d}_{c,n}^{(i)}$, n=1 ... KN, i=1,2 of the data symbols $d_n^{(i)}$, n=1 ... KN, i=1,2 according to Equation (35). The continuous-value estimates $\hat{d}_{c,n}^{(i)}$, n=1 ... KN, i=1,2 are combined to form the vectors $$\underline{\hat{d}}_c^{(i)} = (\hat{d}_{c,1}^{(i)}, \hat{d}_{c,2}^{(i)} \ldots \hat{d}_{c,KN}^{(i)})^T, \; i=1,2, \qquad (65)$$

In the downstream quantization stage QS, discrete-value estimates $\hat{d}_{q,n}^{(i)}$, n=1 ... KN, i=1, 2, of the data symbols $d_n^{(i)}$, n=1 ... KN, I=1,2 according to Equation (35) are obtained by quantization of the continuous-value estimates $\hat{d}_{c,n}^{(i)}$, n=1 ... KN, i=1,2 according to Equation (65). Using the symbol range $V_d$ according to Equation (3), the quantization rule is given by $$\hat{d}_{q,n}^{(i)} = v_{d,\mu}, \text{ falls } |\hat{d}_{c,n}^{(i)} - v_{d,\mu}| < |\hat{d}_{c,n}^{(i)} - v_{d,\upsilon}|, \; \forall \mu \neq \upsilon, \mu,\upsilon = 1 \ldots m, \; n=1 \ldots KN, \; i=1,2, \qquad (66)$$

The discrete-value estimates $\hat{d}_{q,n}^{(i)}$, n=1 ... KN, i=1,2 according to Equation (66) are combined to form the vectors $$\underline{\hat{d}}_q^{(i)} = (\hat{d}_{q,1}^{(i)}, \hat{d}_{q,2}^{(i)} \ldots \hat{d}_{q,KN}^{(i)})^T, \; i=1,2, \qquad (67)$$

The linear block equalizers which are used here are the known zero forcing block linear equalizer, ZF-BLE, and the known minimum mean square error block linear equalizer, MMSE-BLE. Reference should be made in this context to Jung, P. Blanz, J.; Baier, P. W.; Coherent Receiver Antenna Diversity for CDMA Mobile Radio Systems Using Joint Detection. Proc. IEEE International Symposium on Personal, Indoor, and Mobile Radio Communications (PIMRC'93), Yokohama, pages 488–492, 1993.

Block equalizers can also be used for data detection which have quantized feedback and determine both continuous-value estimates $\hat{d}_{c,n}^{(i)}$, n=1 ... KN, i=1,2 according to (65) as well as discrete-value estimates $\hat{d}_{q,n}^{(i)}$, n=1 ... KN, i=1,2 according to Equation (67) of the data symbols $d_n^{(i)}$, n=1 ... KN, i=1,2 according to Equation (35). The block equalizers which may advantageously be used and have quantized feedback are the known zero forcing block equalizer with quantized feedback (zero forcing block decision feedback equalizer, ZF-BDFE) and the minimum mean square error block equalizer with quantized feedback (minimum mean square error block division feedback equalizer, MMSE-BDFE).

Figure 6:
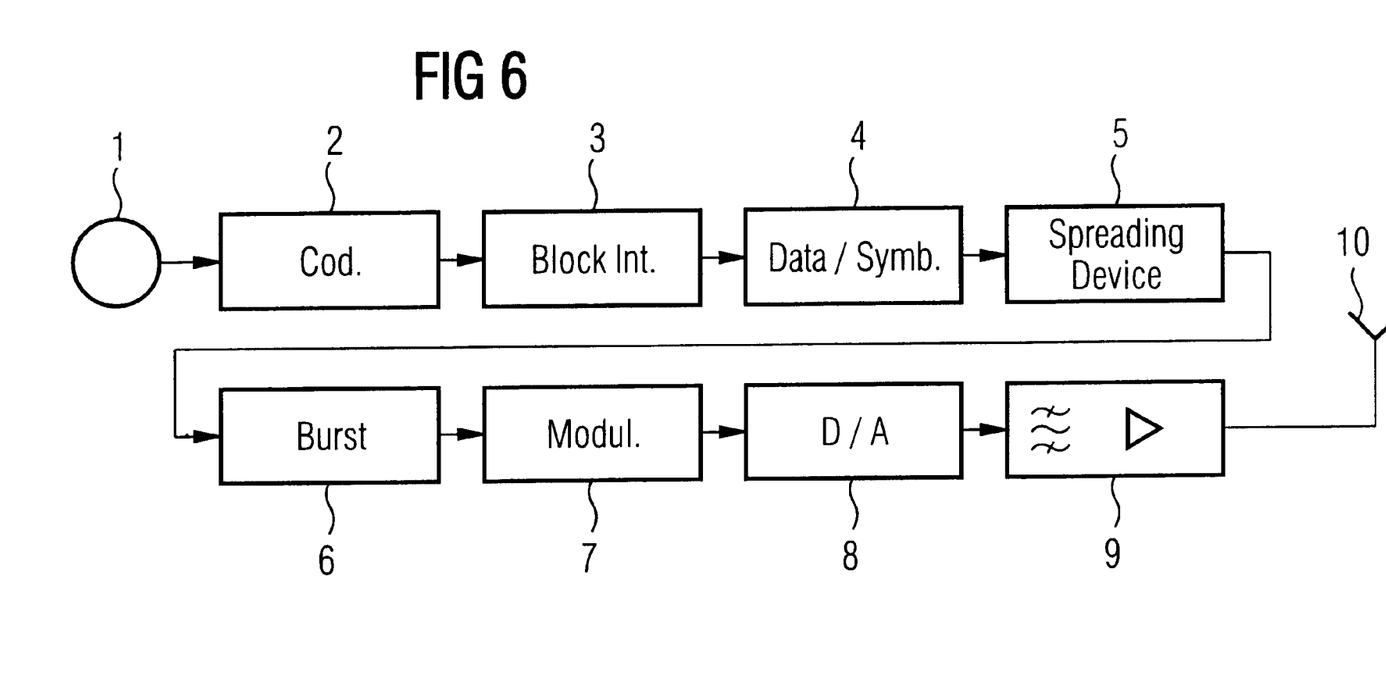
FIG. 6 shows the block diagram structure of a subscriber transmitter in a JD-CDMA mobile radio system.

FIG. 6 uses an example to show the structure of a subscriber transmitter in the uplink of a JD-CDMA mobile radio system. Each transmitter is composed of a data source 1, a channel coder 2, a block interleaver 3, a data-to-symbol converter 4, a subscriber-specific spreading modulator 5 (chip duration of the spreading code $=T_c$), a burst former 6, a digital modulator 7, a digital-to-analog converter 8, a transmitting filter 9 with a transmitting amplifier, and a transmitting antenna 10.

Figure 7:
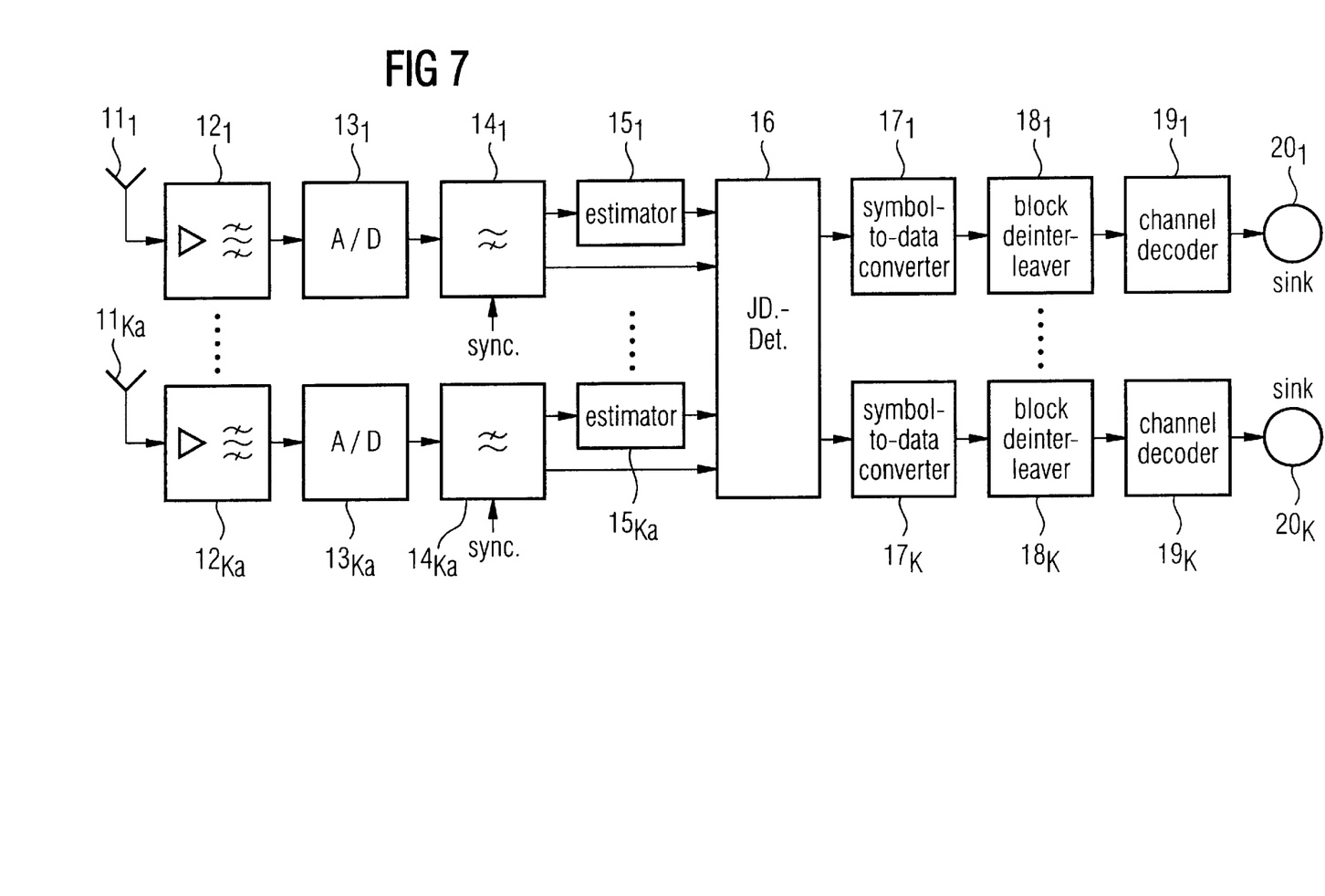
FIG. 7 shows the block diagram structure of the receiver in a base station of a JD-CDMA mobile radio system.

FIG. 7 uses an example to show the structure of a receiver of a base station in a radio cell of a JD-CDMA mobile radio system. Coherent receiving antenna diversity is used in the receiver of the base station. The receiver is thus composed of $K_a$ receiving antennas 11, $K_a$ receiving amplifiers 12 with receiving filters, $K_a$ analogue-to-digital converters 13. $K_a$ digital low-pass filters 14, $K_a$ channel estimators 15, a common JD detector 16, K symbol-to-data converters 17, K block deinterleavers 18, K channel decoders 19 and K data sinks 20. The signal which is received via the $K_a$ receiving antennas 11 is the sum of additive, stationary interference and K subscriber signals which result from the transmission of bursts via variant-time and frequency-selective mobile radio channels. The reception amplification in the receiving amplifier 12 is followed by band limiting using the associated reception filter, which is designed as a low-pass filter. The sampling rate of the analogue-to-digital converter 13 which then follows is $2/T_c$ ($T_c$=chip duration). Minor differences between the delay times of the $K_a$ received signals are compensated for by a suitably designed synchronization device. The $K_a$ sets of samples are digitally low-pass filtered in the low-pass filters 14, and the sampling rate is then decimated to $1/T_c$. The segments, which are defined exclusively by interblock sequences, of the $K_a$ sampled received signals thus obtained are processed by the $K_a$ channel estimators, and $K \cdot K_a$ channel pulse responses are thus estimated. The interference of the interblock sequences of all K subscribers in the received signal are also overcome according to the present invention before the actual data detection in the JD detector 16, in that the interference of the interblock sequences of all K subscribers is modeled using the estimated channel pulse responses, and is subtracted from the received signal. The suboptimal JD method which is provided in particular for the JD-CDMA mobile radio system uses predetection maximal-ratio combining and determines $2 \cdot K \cdot N$ continuous-value estimates of the transmitted data symbols for a burst. ZF-BLE, MMSE-BLE, ZF-BDFE and MMSE-BDFE are available as JD methods. The $2 \cdot N$ complex-value and continuous value estimates of the data symbols, which estimates are determined by the JD method for each of the K subscribers, are mapped by means of the K subscribers, are mapped by means of the converters 17 onto N real, continuous-value estimates. After a specific number of bursts have been received, the real, continuous-value estimates, based on these bursts, of the data symbols are then used as input variables to the channel decoders 19. The K decoded data sequences are finally fed into the K data sinks 20.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for simultaneously transmitting digital signals from a transmitting end to a receiving end, via channels which are different at the receiving end before detection of the digital signals, comprising the steps of:

estimating pulse responses of received digital signals;

transmitting each of the digital signals at discrete times in the form of successive bursts, each burst is composed of a specific training sequence for channel estimation at the receiving end and of at least one of data block which is transmitted after the training sequence, said one data block having the digital signals in the form of data symbols;

assigning a spread code to the bursts, the spread code being applied linearly in order to achieve a code division multiple access mode;

for overcoming interference in the training sequence with the data blocks at the receiving end before the actual signal detection, modeling said interference using the estimated pulse response per channel and subtracting the modeled interference from the received signal.

2. The method according to claim 1, wherein K discrete-time transmitted signals $s^{(k)}$, k=1 . . . K, are transmitted simultaneously from the transmitting end to the receiving end via K channels which are in general different, and have discrete-time pulse responses, $h^{(k)}=h_1^{(k)}, h_2^{(k)} \ldots h_W^{(k)}$), k=1 . . . K , each of the bursts of the transmitted signals containing a data block $d^{(k1)}=(d_1(k1), d_2(k1) \ldots d_N^{(k1)})^T$, k=1 . . . K before the training sequence, that is an interblock sequence, $m^{(k)}=(m_1^{(k)}, m_2^{(k)}, m_{L_M}^{(k)}$, k=1 . . . K and a data block $d^{(k2)}=(d_1^{(k2)}, d_2^{(k2)} \ldots d_N^{(k2)})$T, k=1 . . . K, after this interblock sequence $m^{(k)}d_1^{(k1)}, d_2^{(k1)}, d_2^{(k1)} \ldots$ and $d_1^{(k2)}$, $d_2^{(k2)}$ being the data symbols onto which a specific spread code $c^{(k)}=(c_1^{(k)}, c_2^{(k)} \ldots c_Q^{(k)})$, k=1 . . . K which is assigned to them is linearly modulated before transmission and $m_1^{(k)}$, $m_2^{(k)} \ldots$ being interblock sequence elements which are transmitted using a spread code clock, $c^{(k)}=(c_1^{(k)}, c_2^{(k)} \ldots c_Q^{(k)})$, k=1 . . . K and wherein estimates of the channel pulse responses are present at the receiving end, wherein a received signal ẽ which has been freed of symbol interference of the interblock sequences $m^{(k)}$, k=1 , , , K with adjacent data blocks $d_1^{(k)}$ and $d_2^{(k)}$, k=1 , , , K and taking account of an additive interference signal n ($n_1$, $n_2$ . . . $n_{Q+W-1}$) by the design of the following function:

$$\tilde{e} = \underline{n} + \sum_{k=1}^{r} \left( \underline{H}^{(k)} ((\underline{C}^{(k)}\underline{d}^{(k,1)})^T, 0_{L_m}^T, (\underline{C}^{(k)}\underline{d}^{(k,2)})^T) \right)^T,$$

with the $(2NQ+L_m+W-1) \times (2NQ+L_m)$ matrices $$\underline{H}^{(k)} = (\underline{H}_{i,j}^{(k)}),$$

$$i = 1 \ldots 2NQ + L_m + W - 1, \; j = 1 \ldots 2NQ + L_m, \; k = 1 \ldots K$$

$$\underline{H}_{l+w-1,l}^{(k)} = \begin{cases} h_w^{(k)} & \text{for } l = 1 \ldots 2NQ + L_m, \\ & w = 1 \ldots W \\ & k = 1 \ldots K \\ 0 & \text{else} \end{cases}$$

and with NQ×N matrices $$\underline{C}^{(k)} = (C_{i,j}^{(k)}), \; i = 1 \ldots NQ, \; j = 1 \ldots N, \; k = 1 \ldots K,$$

$$\underline{C}_{q+(n-1)Q,n}^{(k)} = \begin{cases} c_q^{(k)} & \text{for } n = 1 \ldots N \\ & q = 1 \ldots Q \\ & k = 1 \ldots K \\ 0 & \text{else} \end{cases}$$

and with a predetermined number of elements $L_m$ of the interblock sequences $m^{(k)}$.

3. The method according to claim 2, wherein, an estimation which matches expectations, of minimal variance for a vector of all channel pulse responses is carried out for channel estimation from a received signal which is caused by the interblock sequences and from the interference.

4. The method according to claim 3, wherein filters which are matched to the signal are used for channel estimation.

5. The method according to claim 2, wherein a code family for the interblock sequence code is obtained from a single basic code which is made periodic.

6. The method according to claim 5, wherein channel estimation is carried out in the frequency domain by using fast correlation.

7. A method for simultaneously transmitting digital signals from a transmitting location to a receiving location, via channels, which are different at the receiving end, before detection of the digital signals, comprising the steps of:

estimating pulse responses of received digital signals;

transmitting each of the digital signals at discrete times in the form of successive bursts, each burst being composed of a specific training sequence for channel estimation at the receiving end and of at least one of data block which is transmitted after the training sequence, said one data block having the digital signals in the form of data symbols;

assigning a spread code to the bursts, the spread code being applied linearly in order to achieve a code division multiple access mode;

for overcoming interference in the training sequence with the data blocks at the receiving end before the actual signal detection, modeling said interference using the estimated pulse response per channel and subtracting the modeled interference from the received signal;

providing a radio system of cellular construction having a plurality of subscribers and having one base station per radio cell, transmission of the signals in a radio cell being carried out using a JD-CDMA method;

handling in parallel a multiplicity of wanted connections in a common RF frequency band, each of wanted signals being spread by a specific factor on the frequency axis at the transmitting location using a different spread code;

decoding the spread wanted signals at the receiving location using said spread code; and using a JD-CDMA specific signal detection unit for signal detection in the receiving devices.

8. The method according to claim 7, wherein a linear data block equalizer with a downstream quantization stage is used for data detection, continuous-value estimated values of the data symbols being determined in the block equalizer and being combined to form vectors; and wherein discrete-value estimated values of the data symbols are obtained in the quantization stage by quantization of the continuous value estimated values.

9. The method according to claim 7, wherein the linear data block equalizer is a linear zero forcing block equalizer.

10. The method according to claim 8, wherein the linear data block equalizer is a minimum mean square error block equalizer.

11. The method according to claim 7 wherein a block equalizer having quantized feedback is used for data detection.

12. The method according to claim 11, wherein the block equalizer is a zero forcing block equalizer having contest feedback.

13. The method according to claim 11, wherein the block equalizer is a minimum mean square error block equalizer having contest feedback.

14. The method according to claim 7, wherein the method is utilized as a hybrid multiple access method which has a combination of code division multiplex frequency division multiplex and time division multiplex.

15. A system for radio transmission of digital signals from a transmitting end to a receiving end, via channels which are different at the receiving end before detection of the digital signals, comprising:

each of the digital signals being transmitted at discrete times in the form of successive bursts, each burst is composed of a specific training sequence for channel estimation at the receiving end and of at least one of data block which is transmitted after the training sequence, said one data block having the digital signals in the form of data symbols;

a spread code assigned to the bursts, the spread code being applied linearly in order to achieve a code division multiple access mode;

for overcoming interference in the training sequence with the data blocks at the receiving end before the actual signal detection, said interference is modeled using an estimated pulse response per channel and subtracting the modeled interference from the received signal;

a digital signal processor at the receiving end to overcome any interference in the training sequence before actual signal detection; and said interference being modeled using the estimated pulse response per channel and the modeled interference is subtracted from the received signal.

16. The system according to claim 15, wherein the signal processor has a plurality of channel estimators and a common JD detector.

17. The system according to claim 15, where the signal processor is a microprocessor.

18. A method for simultaneously transmitting digital signals from a transmitting location to a receiving location, via channels, which are different at the receiving end, before detection of the digital signals, comprising the steps of:

estimating pulse responses of received digital signals;

transmitting each of the digital signals at discrete times in the form of successive bursts, each burst being composed of a specific training sequence for channel estimation at the receiving end and of at least one of data block which is transmitted after the training sequence, said one data block having the digital signals in the form of data symbols;

assigning a spread code to the bursts, the spread code being applied linearly in order to achieve a code division multiple access mode;

for overcoming interference in the training sequence with the data blocks at the receiving end before the actual signal detection, modeling said interference using the estimated pulse response per channel and subtracting the modeled interference from the received signal;

providing a radio system of cellular construction having a plurality of subscribers and having one base station per radio cell, transmission of the signals in a radio cell being carried out using a JD-CDMA method;

handling in parallel a multiplicity of wanted connections in a common RF frequency band, each of wanted signals being spread by a specific factor on the frequency axis at the transmitting location using a different spread code;

decoding the spread wanted signals at the receiving location using said spread code;

using a JD-CDMA specific signal detection unit for signal detection in the receiving devices;

providing a linear data block equalizer with a downstream quantization stage for data detection, continuous-value estimated values of the data symbols being determined in the block equalizer and being combined to form vectors; and obtaining discrete-value estimated values of the data symbols in the quantization stage by quantization of the continuous value estimated values.

19. The method according to claim 7, wherein the linear data block equalizer is one of a linear zero forcing block equalizer and a minimum mean square error block equalizer.

20. The method according to claim 11, wherein the block equalizer is one of a zero forcing block equalizer having contest feedback and a minimum mean square error block equalizer having contest feedback.

* * * * *